United States Patent [19]

Nicholson

[11] 4,190,204
[45] Feb. 26, 1980

[54] SHOWER NOZZLE FOR FABRIC CONDITIONER

[75] Inventor: Charles B. Nicholson, Glens Falls, N.Y.

[73] Assignee: Albany International Corp., Menands, N.Y.

[21] Appl. No.: 943,051

[22] Filed: Sep. 18, 1978

[51] Int. Cl.² ............................................. B05B 15/02
[52] U.S. Cl. .................................................. 239/109
[58] Field of Search ................ 239/107, 109, 452, 108

[56] References Cited
U.S. PATENT DOCUMENTS

| | | | |
|---|---|---|---|
| 2,803,499 | 8/1957 | Goyette | 239/109 |
| 2,954,170 | 9/1960 | Goyette | 239/109 |
| 3,268,172 | 8/1966 | Goyette | 239/109 |
| 3,990,637 | 11/1976 | Nicholson | 239/108 |

Primary Examiner—Richard A. Schacher
Attorney, Agent, or Firm—Kane, Dalsimer, Kane, Sullivan and Kurucz

[57] ABSTRACT

A shower for use in conditioning of felt or wire fabric in papermaking utilizing a two position nozzle. One position is a spray position and the other position is a purge position with the two positions being determined by the relative location of an interior piston with respect to a surrounding tubular body having a valving member at the upper end thereof. The size of the opening created by shifting the position of the piston relative to the valving member determines whether or not a spray or a purging flow passes from the nozzle. The nozzle communicates with the interior of a spray pipe and a volume control is provided in the form of cooperating openings and ports in the tubular body and piston slidably housed therein positioned so that a greater number of openings and accordingly opening area is provided between the interior of the spray pipe and the valving member in the spray position and a lesser number of openings and area of opening is provided for introduction of liquid from the spray pipe to the valving head in the purge position. This action facilitates the use of a single water supply for the nozzle arrangement and facilitates movement of the nozzle between the purge and spray position with the assistance of a spring housed between the piston and to the body of the housing.

8 Claims, 4 Drawing Figures

SHOWER NOZZLE FOR FABRIC CONDITIONER

BACKGROUND OF THE INVENTION

Showers are used in the papermaking industry to condition felt or wire fabrics. One such fabric conditioning application is where a flood of water or other liquid under low pressure is supplied to the felt surface to flush dirt particles from the felt and to neutralize wet streaks. A second conditioning application is where water is sprayed under pressure onto a felt in order to actually dislodge dirt particles from the fiber/yarn structure and to resist compaction. This requires intermittent use.

Shower systems are provided today which combine both purging and spraying and nozzles are available such as that disclosed in U.S. Pat. No. 2,803,499; U.S. Pat. No. 2,954,170; and U.S. Pat. No. 3,990,637 which perform this dual function. In nozzles of this type two positions of operation are utilized. One position is a purging position and the other position is a spray position.

While the systems as disclosed in the above patents provide many advantages there is still one difficulty in the dual type of nozzle system under consideration which clearly requires an improvement. It is well known that to form a good spray pattern, there must be an adequate supply of water presented to the orifice. This can be done by having a large hole through the piston to form a reservoir. The problem with having a large hole through the piston is, when the nozzle goes on purge, there is a large increase in volume discharged through the nozzles.

A single pumping system cannot handle high pump pressure of around 300 to 400 psi with low flows and also handle high flows at low or around 25 psi.

Competitive showers and systems that have spring loaded nozzles work on a secondary supply system. Water supply is valved off enough to reduce shower water pressure to cause the nozzles to open and yet hold the pump pressure up on its pressure curve. What is needed then is a second system to supply volume for purging and enough pressure to close the nozzles so the high pressure pump can again supply the showers.

SUMMARY OF THE INVENTION

With the above background in mind, it is among the primary objectives to provide an improved spray nozzle for use with a spray pipe which is of the purgeable nozzle type with two principal positions. It is closed for normal spray and opened for purging or nozzle cleaning. In the normal or spray position, the piston is moved up against a valving member in the top of the nozzle. The valving member has a configuration to form a selected spray pattern when the piston has moved upward into the spray position and a positive contact position. The piston is shiftable to a purge position away from the valving member wherein the configuration of the valving member provides for a larger opening and a greater opening for purging or nozzle cleaning purposes.

It is an objective to provide an outer tubular member and an interior slidable piston both positioned for communication with the interior of a spray pipe and the tubular member having a valving member overlying the piston so that the piston is shiftable between the spray and purge positions as it slides within the tubular member. The piston and tubular member are designed so that when they are inserted in the spray pipe all liquid from the spray pipe must pass through the piston into contact with the valving member for exiting therefrom.

It is an object of the present invention to provide volume flow control of liquid between the spray pipe and the interior of the piston to facilitate operation of the two position nozzle. This is accomplished by the provision of an arrangement of ports and openings in the piston and tubular outer member respectively which are shiftable into and out of alignment thereby controlling the number of holes and the area of opening available for liquid from the spray pipe to enter the nozzle. A groove can be positioned in the body or piston to facilitate communication between the holes in the respective parts to compensate for any misalignment therebetween. The piston is designed of an interior water chamber serving as a reservoir being fed by a port through the bottom and four ports through the side. The tubular body surrounding the piston has four similar openings in its side wall and an open bottom end. When the nozzle is open and in the purge position only the bottom port in the piston is open to the interior of the spray pipe through the open bottom end of the tubular member for supplying water for purging. By preselecting the port size, we can control the amount of discharge water. When the nozzle is shifted to the closed position with the piston being slidably movable in the tubular member, the ports in the side wall of the piston or the openings in the side wall of the tubular member become aligned with the groove, thus providing five openings or passageways for liquid from the spray pipe to pass into the reservoir within the piston to properly supply the spray. The five openings include the four ports and openings in the side walls of the piston and tubular member, respectively, and the single port in the base of the piston and the open bottom end of the tubular member. Once again the sizes of the openings and ports help control the volume of flow of liquid from the spray pipe to the interior of the nozzle and thus help control operation of the nozzle.

The volume control provided by the arrangement and size of the openings and ports allows for a more easily sized system with a single water supply. In this manner, a shower can be tailor made to fit a system by merely changing hole size and arrangements.

In summary, the combination spray pipe and spray nozzle is provided with the nozzle including a generally tubular body in alignment with the spray hole through the wall of the pipe. A bore is in the tubular body and a piston is slidably fitted in the bore of the tubular body. A central passageway is formed in the piston and communicates the interior of the spray pipe to the outside thereof. A first seal means is mounted on the piston and cooperates with the tubular body and confines the contents of the spray pipe to the cenral passage. A valving member of the tubular body is disposed on the center line of the central passageway. A spray position of the piston has its outer end abutting the valving member and the piston is maintained in the spray position by the force of the content of the spray pipe pressing thereagainst. A blocking surface of the valving member overlies a first portion of the central passage and blocks a portion thereof in the spray position. A spray surface of the valving member is spaced from and overlies a second portion of the central passage in the spray position whereby liquid exiting said central passage in said spray position will impinge thereon to be formed into and directed as a spray. A purging position of the piston locates its outer end spaced from the valving member. Means is provided for shifting the piston between spray and purge positions. Flow volume controls which are responsive to shifting of the piston between the spray and purge positions vary the volume of liquid being directed from the spray pipe into the central passage of the piston.

With the above objectives among others in mind, reference is made to the attached drawing.

DETAILED DESCRIPTION

Figure 1:
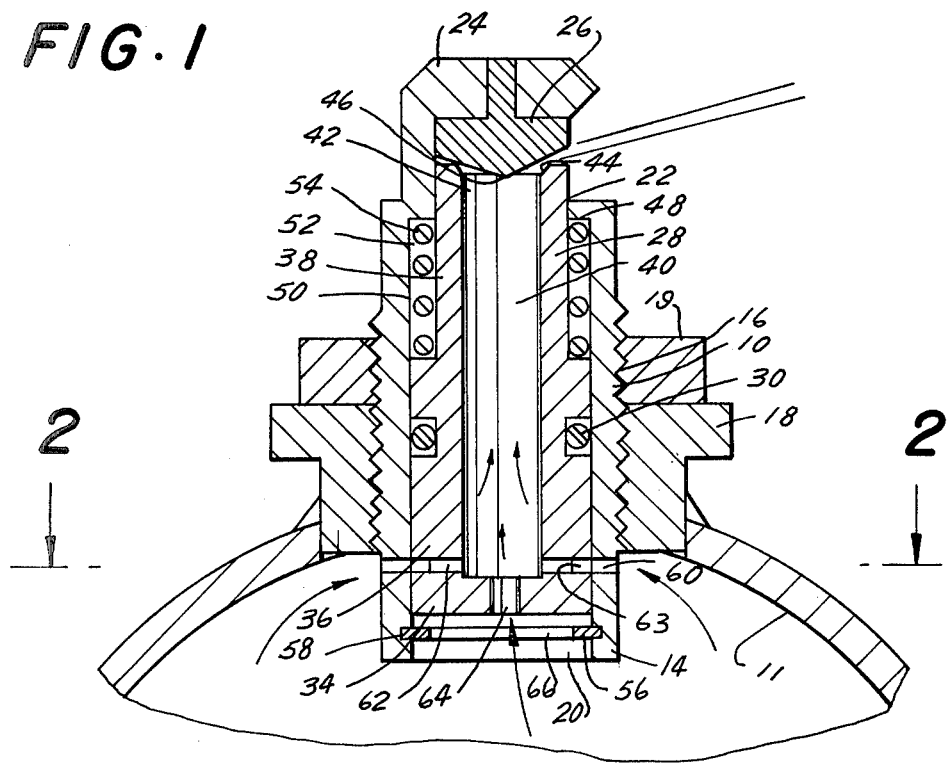
FIG. 1 is a fragmentary sectional elevational view of the spray nozzle of the invention mounted on a spray pipe and in the spray position with the arrows showing the direction of flow from the spray pipe into the interior of the nozzle.

Similar components of the present invention are well known and are readily recognizable in the above referenced prior art patents, particularly U.S. Pat. No. 3,990,637. Thus, where possible, similar components are not discussed again in detail.

In the depicted embodiment, the generally tubular body member or casing 10 which is preferably formed of a metal such as stainless steel is in alignment with and projecting through the spray hole 11 in the wall of spray pipe 12. The tubular member 10 has a lower end portion 14 which extends through opening 11 in the spray pipe to the interior thereof. The upper portion of the tubular member 10 which extends above spray pipe 14 has a threaded outer surface 16 for threaded interengagement with conventional supporting structure 18 mounted on the spray pipe 12. For example, mounting can be accomplished by welding structure 18 to the pipe, as shown, after being positioned in the receiving aperture of the pipe.

A lock nut 19 is threaded onto member 10 until it seats against the top of structure 18 to assist in retaining the parts together. The tubular member 14 has an open bottom end 20 and a cenral opening 22 in its upper end. Supporting structure 18 can be formed of a conventional material such as plastic.

An L-shaped bracket portion 24 extends upward from the upper end of tubular member 10 and overlies the opening 22 in the upper end thereof. Mounted in the overlying portion of bracket 24 and extending downwardly therefrom is a valving member 26 which is also in alignment with the open upper end 22 of the tubular member and in position for cooperation with a slidable piston 28 mounted in the interior of tubular member 10.

Piston 28 is slidably fitted within the bore of tubular body 10 in sealing engagement therewith which is insured by a sealing gasket or O-ring 30 positioned in a recess in the exterior surface of piston 28 and in engagement with the interior wall of tubular member 10.

Supporting structure 18 and the nozzle arrangement including outer tubular body 10 is sealed at the location where it passes through opening 11 in the spray pipe by welding or similar means.

The piston 28 is also generally tubular in configuration and includes a base wall 34, a larger outer diameter lower side wall portion 36 and a narrower outer diameter upper side wall portion 38. The piston is hollow to form an interior passageway or chamber 40. The piston has an open upper end 42 surrounded by a beveled peripheral edge 44 which forms a partial bearing surface with the adjacent conically shaped undersurface 46 of valving member 26. The relative shape of the undersurface 46 of the valving member and the beveled peripheral rim of the piston provides for the desired spray action and purge action in the two positions of the nozzle in a manner well known in the prior art including the references of record. Valving member 26 is mounted in bracket 24 in a conventional manner. The piston is formed of a similar material as the outer tubular member, such as stainless steel.

The upper threaded end portion 16 of the tubular member 10 is formed with an inwardly extending annular shoulder or flange 48 which terminates at the opening 22 in the upper end of the tubular member. The inner surface of this flange 48 cooperates with an opposing annular shoulder 50 formed at the join line between larger outer diameter wall portion 36 and narrower outer diameter upper wall portion 38 of the piston 28 to form a recess 52 to house a helical compression spring 54 which tends to force the piston downward with respect to the tubular body 10 which is mounted in fixed position. Downward movement of the piston is limited by a stop ring 56 mounted in an annular notch 58 adjacent the bottom open end 20 of tubular member 10 and extending inward so as to form an engagement surface for the undersurface of base 34 of the piston. Thus, the axial movement of the piston relative to the tubular member is restricted by the ring 56 in one direction and the valve member 26 in the other axial direction.

The lower portion of outer tubular member 10 which is extended into the interior of spray pipe 12 includes in addition to its open bottom end 20, an arrangement of openings through its side wall. In the depicted embodiment, there are four such openings 60 spaced at 90 degrees intervals about the peripheral surface of the tubular member and providing communication between the interior of the pipe and the interior of the tubular member.

The piston has a similar arrangement of four ports through the side walls of its lower wall portion 36. These ports 62 are spaced at 90 degree intervals about the periphery of the piston 28 in position for alignment with the openings 60 of the tubular member when the proper axial relative position is reached. Ports 62 are interconnected by an annular groove 63 to accommodate any misalignment between the ports and the openings 60 in the tubular member to facilitate maintenance of communication between passageways. Alternatively, the groove could be positioned in the tubular member instead of the piston for the same purpose, or, instead of a single circumferential groove, an interrupted groove or groove segments can be used in either the tubular member or the piston for the same purpose. In this condition, as depicted in FIGS. 1 and 2, there is communication between the interior of spray pipe 12 and the interior chamber 40 within the piston 28.

A further port is also provided in the piston. This base port 64 is centrally located in base 34 and provides direct communication between the interior of pipe 12 and chamber 40 in the piston through the open end 20 in the base of the tubular member and the open center 66 of ring 56.

Figure 2:
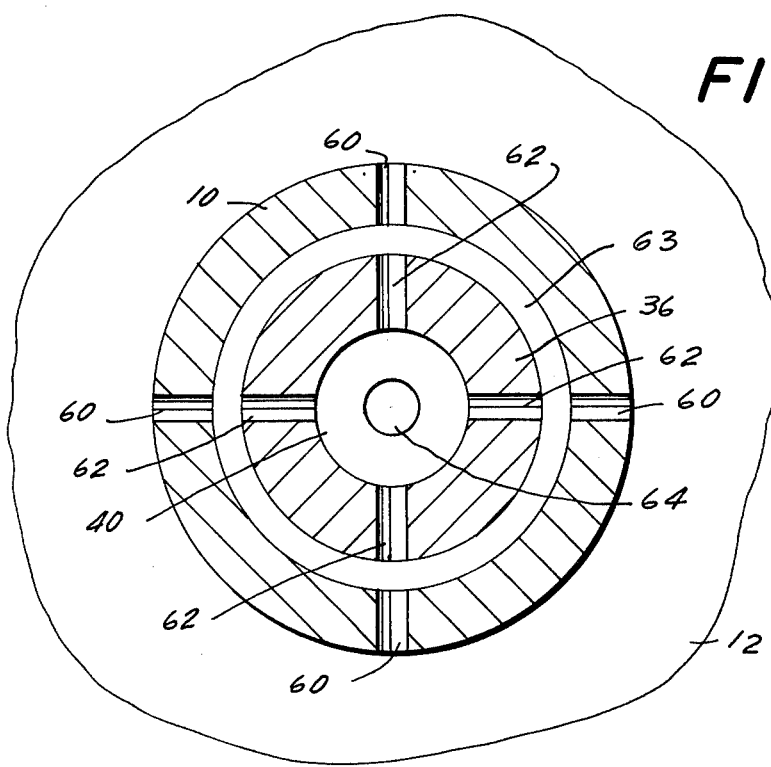
FIG. 2 is an enlarged sectional top view thereof taken along the plane of line 2—2 of FIG. 1.

In the spray position as shown in FIGS. 1 and 2, alignment is present between all of the openings and ports in the lower portions of outer member 10 and piston 28 providing for five passageways for liquid from the spray pipe to enter chamber 40 as shown by the arrows in FIG. 1 and to be directed to the spray openings between the valve member 26 and the upper open end 42 of the piston. All of the liquid from the spray pipe is directed through these pathways with all other openings being sealed.

Figure 3:
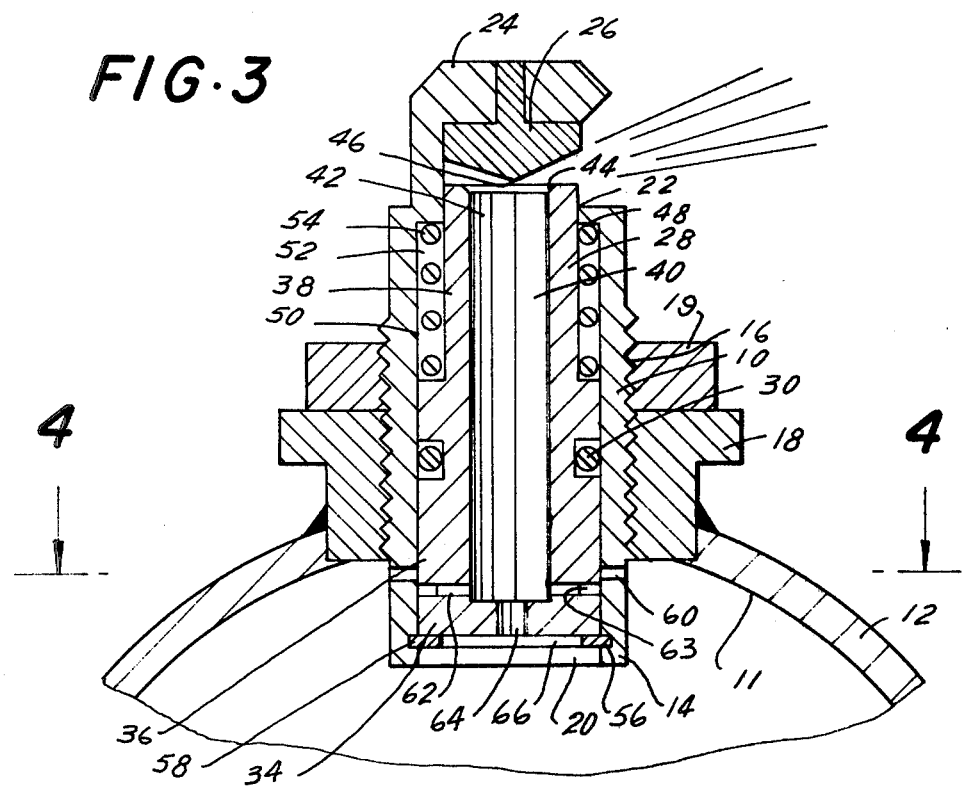
FIG. 3 is a fragmentary sectional elevational view thereof showing the spray nozzle in the purge position with an arrow showing the direction of fluid flow from the spray pipe to the interior of the nozzle.
Figure 4:
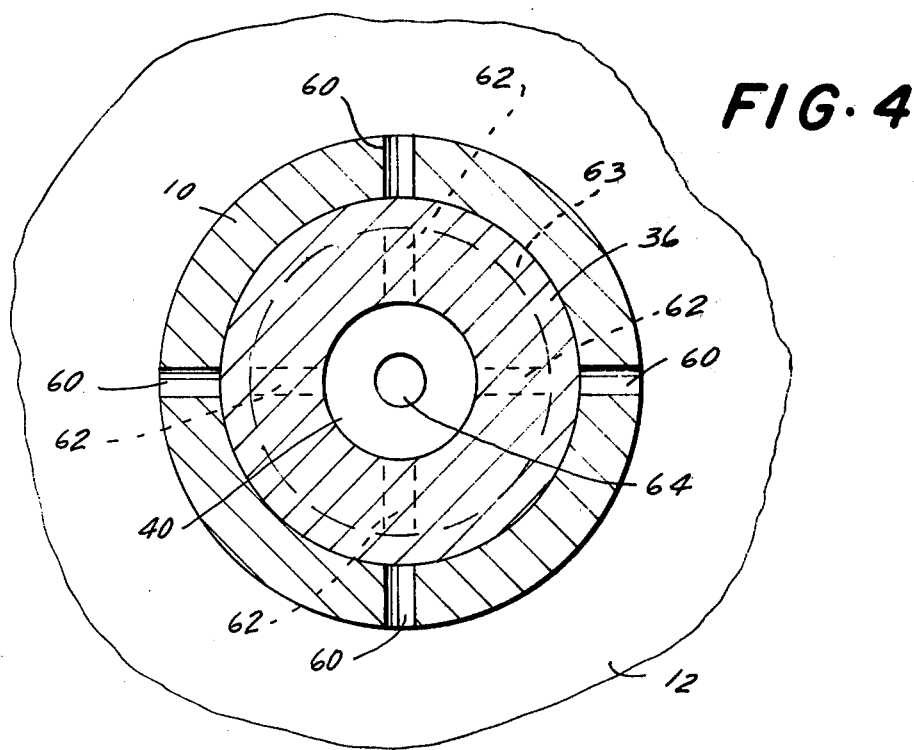
FIG. 4 is an enlarged top sectional view thereof taken along the plane of line 4—4 of FIG. 3.

When the nozzle is shifted to the purge position, as shown in FIGS. 3 and 4, piston 28 is shifted downward away from valving member 26 with the assistance of the force of biased helical spring 54 thus providing for a larger opening at the upper end of the nozzle for a liquid to flow therefrom. At the lower end of the nozzle, the ports 62 in piston 28 are moved downward out of alignment with openings 60 in tubular member 10. This cuts off and closes four passageways for liquid from the interior of pipe 12 to the interior of the nozzle. The only remaining opening is through open end 20 of the bottom of the tubular member and through the base port 64 in the base of the nozzle. This is depicted by the arrow in FIG. 3. The results, of course, in addition to the reduced area for liquid to flow into the nozzle from the spray pipe, an increase in pressure on the base of the piston tending to assist in directing the piston upward to the closed or spray position and to bias helical spring 54 once again when returning to the spray position as depicted in FIGS. 1 and 2. The full purge position is determined by the bottoming of base 34 against stop ring 56. The number and arrangement as well as the size of the openings and ports in the tubular member and the piston is a matter of choice depending upon the type of flow desired.

Chamber 40 in the interior of the piston 28 forms a water chamber to serve as a reservoir which is fed by the hole 64 in the base 34 of the piston and the open bottom end of the tubular member and, when in the spray position, the four ports 62 in alignment with the opening 60 in the side walls of the base 28 and tubular member respectively.

When the nozzle is open, or in the purge position, only the bottom port 64 supplies water for purging. By selecting the hole size, the amount of discharge water can be controlled. When the nozzle is closed in the spray position, the reservoir 40 is fed by all five passageways to properly supply the spray. The recess permits for more easily sizing of the system with a single water supply. In fact, a shower can be tailor made to fit a system by changing hole size and arrangement.

In addition to the above described system in regard to water pressure and spring pressure to shift between positions, other conventional means for shifting between the purge and spray position well known in the art, such as in the references described above, can be employed to facilitate and accomplish the shifting action.

Thus the several aforenoted objects and advantages are most effectively attained. Although several somewhat preferred embodiments have been disclosed and described in detail herein, it should be understood that this invention is in no sense limited thereby and its scope is to be determined by that of the appended claims.

I claim:

1. In combination with a spray pipe, a spray nozzle, said nozzle comprising; a generally tubular body in alignment with the spray hole through the wall of said pipe, a bore of said tubular body, a piston slidably fitted in said tubular body within said bore, a central passage formed in said piston and communicating the interior of said spray pipe to the outside thereof, a first seal means cooperating with said tubular body and said piston and confining the contents of said spray pipe to said central passage, a valving member of said tubular body and disposed on the centerline of said central passage, a spray position of said piston with the upper end thereof abutting said valving member, said piston maintained in said spray position by the force of the content of said spray pipe pressing thereagainst, a blocking surface of said valving member overlying a first portion of said central passage and blocking a portion thereof in said spray position, a spray surface of said valving member spaced from and overlying a second portion of said central passage in said spray position whereby liquid exiting said cenral passage in said spray position will impinge thereon to be formed into and directed as a spray, a purging position of said piston with the upper end thereof spaced from said valving member, means for shifting the piston between the spray and purged positions, and flow volume control responsive to shifting of the piston between the spray and purge positions to vary the volume of liquids being directed from the spray pipe into the central passage of the piston.

2. The invention in accordance with claim 1 wherein the flow volume controls include a plurality of ports in said piston and plurality of openings in said tubular body, the openings in the tubular body in communication with the interior of the spray pipe and the ports in the piston being positioned so that a predetermined number of ports are aligned with openings in the body and in communication with the interior of the pipe in the spray position and a different predetermined number of ports are aligned with openings in the tubular body and in communication with the spray pipe in the purge position.

3. The invention in accordance with claim 2 wherein at least one groove is in one of the piston and the tubular body to interconnect both the openings and ports therein to facilitate communication therebetween.

4. The invention in accordance with claim 3 wherein there is one continuous annular groove in the piston communicating with the ports therein and adapted to be brought into communication with the opening in the tubular body.

5. The invention in accordance with claim 2 wherein one end portion of the tubular body and the piston are mounted in sealed position within the spray pipe and the openings in the tubular body being spaced about the peripheral sides of the tubular body portion sealed within the interior of the spray pipe, the ports in the piston being positioned about the peripheral surface of the portion located within the spray pipe, the base of the tubular body both being located within the spray pipe and being open and the piston in the tubular body having an opening in its base portion located within the spray pipe, the ports in the base and peripheral walls of the piston and the openings in the base and peripheral walls of the tubular body forming relatively movable openings with respect to one another to provide the flow of volume control of liquid from the spray pipe when the piston is shifted between the spray and purge position.

6. The invention in accordance with claim 5 wherein there are four ports spaced about the peripheral side wall of the piston of predetermined diameter and an intersecting annular groove and a single port in the base of the piston of predetermined diameter providing communication between the interior and exterior of the piston, the openings in the side walls of the tubular body being four openings spaced about the periphery thereof and being of predetermined diameter and positioned so that when the piston is in the spray position the openings in the side wall of the tubular body will be aligned with the groove in the peripheral side wall of the piston to provide communication for fluid therethrough from the interior of the spray pipe to the interior of the piston, the opening in the base of the piston being of predetermined size and is open in both the spray and purge positions and provides communication with the interior of the spray pipe through the open end of the tubular body, upon shifting of the piston to the purge position, the groove in the peripheral side walls thereof will be brought out of alignment with the openings in the peripheral side wall of the tubular body so that the only communication between the interior of the spray pipe and the interior of the piston is through the open bottom end of the tubular body and aligned port in the base of the piston.

7. The invention in accordance with claim 1 wherein a spring is housed between adjacent walls of the piston and the tubular body and captured between lateral shoulders formed on the piston and the body in position so that when the piston is moved into the spray position the spring will be compressed and tend to return the piston to the purge position, and when the piston is in the purge position and the ports in the peripheral side wall thereof are not aligned with the openings in the peripheral side wall of the tubular member the liquid force from the spray pipe increases against the base of the piston tending to return the piston to the spray position while all of the liquid flowing from the spray pipe into the interior of the piston passes through the open bottom end of the tubular body and the port in the base of the piston, and when the piston has returned to the spray position the alignment of the ports in the side wall of the piston with the openings in the side wall of the tubular body will increase the flow passage area for liquid from the spray pipe into the interior of the piston and thus reduce the pressure on the base of the piston.

8. The invention in accordance with claim 1 wherein the spray pipe and nozzle of the combination is supplied from a single water supply, the spray and purge velocities for the shower being controlled by the port and opening sizes of the piston and tubular body respectively.

* * * * *